United States Patent [19]

Drennen et al.

[11] Patent Number: 5,667,283

[45] Date of Patent: Sep. 16, 1997

[54] VARIABLE SCREW-DRIVEN SYSTEM

[75] Inventors: David Bernard Drennen, Bellbrook; Ryan Lovell Wright, Dayton, both of Ohio

[73] Assignee: General Motors Corporation, Detroit, Mich.

[21] Appl. No.: 632,189

[22] Filed: Apr. 15, 1996

[51] Int. Cl.[6] .................................................... B60T 8/42

[52] U.S. Cl. ....................... 303/115.2; 60/545; 60/538; 74/567; 74/569

[58] Field of Search .................... 303/115.2, 116.4, 303/113.2; 188/162, 82.77; 60/538, 545, 574; 74/569, 567; 92/32

[56] References Cited

U.S. PATENT DOCUMENTS

| | | | |
|---|---|---|---|
| 3,420,580 | 1/1969 | Dymond | 303/21 |
| 4,653,815 | 3/1987 | Agarwal et al. | 303/100 |
| 4,938,543 | 7/1990 | Parker et al. | 303/113.2 |
| 5,026,126 | 6/1991 | Umasankar et al. | 303/115.2 X |
| 5,147,118 | 9/1992 | Reuter et al. | 303/115.2 |
| 5,246,283 | 9/1993 | Shaw et al. | 303/115.2 |
| 5,439,278 | 8/1995 | Tsukamoto et al. | 303/115.2 |
| 5,454,631 | 10/1995 | Frieling et al. | 303/115.2 |

*Primary Examiner*—Lee W. Young
*Assistant Examiner*—Pamela Lipka
*Attorney, Agent, or Firm*—Jeffrey A. Sedlar

[57] ABSTRACT

A variable screw-driven system includes a rotatable drive screw powered by a motor actuator. A nut is disposed about the drive screw and is linearly translatable in response to rotation of the drive screw. The nut carries a cam follower which travels within a cam track. Linear translation of the nut is altered by tracking of the cam following within the cam track such that rotation of the nut is effected simultaneously with rotation of the drive screw resulting in an effective variable pitch of the variable screw-driven system wherein linear translation of the nut results from both rotation of the drive screw and rotation of the nut.

12 Claims, 3 Drawing Sheets

VARIABLE SCREW-DRIVEN SYSTEM

BACKGROUND OF THE INVENTION

The present invention relates to a variable screw-driven system and more particularly, to a variable, effective screw-pitch-lead driven pressure modulation system.

Screw-driven systems for effecting a desirable pressure change in a braking system are well known devices. U.S. Pat. No. 4,653,815 which issued Mar. 31, 1987 describes one such device. The use of such a motor driven screw to effect translation of a piston that in-turn, effects a corresponding increase or decrease in fluid pressure contained within a closed braking circuit is well known.

In using such a conventional screw-driven system for effecting brake pressure modulation in wheel brake applications or releases, resulting system pressure gradients are important. A significant amount of development has concentrated on providing a motor actuator that operates to enable generation of the pressure and response times required while meeting energy limitation requirements using the now conventional screw-driven technology.

Such motor actuated screw-driven systems have proven particularly successful for use in the application and release of fluid pressure in braking systems. However, this success has resulted in the use of motor actuators that require significant amounts of energy to operate and are somewhat costly.

Electrical power consumption has become increasingly more significant as braking systems find application in electric powered vehicles in addition to the more prevalent internal combustion engine powered vehicles. Accordingly, improvements in screw-driven systems generally, and for use in vehicle braking systems in particular, would benefit from potential improvements resulting in possibly lower energy consumption requirements.

SUMMARY OF THE INVENTION

In the pressurization of a braking system during full braking cycles, it has been found that the actual forces required of the screw-driven system are variable. During initial braking system pressurization, low forces are encountered as brake pads begin to contact their corresponding rotor or shoe and as compliance of hoses in the braking lines is accounted for. During this period of brake application, high fluid flow conditions under relatively low pressures are encountered. Subsequently, as the brake pads begin to fully contact the rotors or drums and compliance is overcome, relatively high pressures, often exceeding 2000 pounds per square inch, are encountered. During this latter period of brake application, relatively lower amounts of fluid flow are required.

In order to meet the requirements for these two functionally different periods of brake application, a screw-driven system must be capable of effecting translation of the piston in a manner resulting in high fluid flow conditions under relatively low pressure while at the same time operating under lower fluid flow conditions and significantly higher pressures.

The present invention provides a variable screw-driven system to generate the required pressure and response times effectively and efficiently during apply and release fluid pressurization cycles for operation in applications such as vehicle braking systems. The screw driven system utilizes a fixedbase screw pitch for basic linear nut movements. The screw nut is connected to a piston for effecting volumetric changes in a closed loop vehicle braking system and generally translates in a linear direction. The nut includes a cam follower which is disposed within a specifically designed cam track. When a motor actuator is used to rotate the screw, the nut responds by translating in the linear direction. Simultaneously, the nut is guided by the attached cam follower that rides in the cam track causing the nut to selectively rotate in response. The cam track can be designed to result in relatively complex effective screw pitch results from the screw driven system.

Simultaneous linear translation and rotation of the nut results in an effective screw pitch which is tailorable to the optimum braking system pressurization requirements. The effective screw pitch is changed by nut rotation simultaneously with screw rotation. As the nut translates in the linear direction the cam follower operates to result in an increase or decrease in the effective dynamic screw pitch.

As a result, the variable screw-driven system is adapted to provide relatively rapid linear translation of a piston when system requirements include relatively high fluid flow conditions and is designed to result in relatively slower linear translation of the piston as fluid flow conditions lessen and operating pressures increase.

DETAILED DESCRIPTION OF THE PRESENTLY PREFERRED EMBODIMENT

Figure 1:
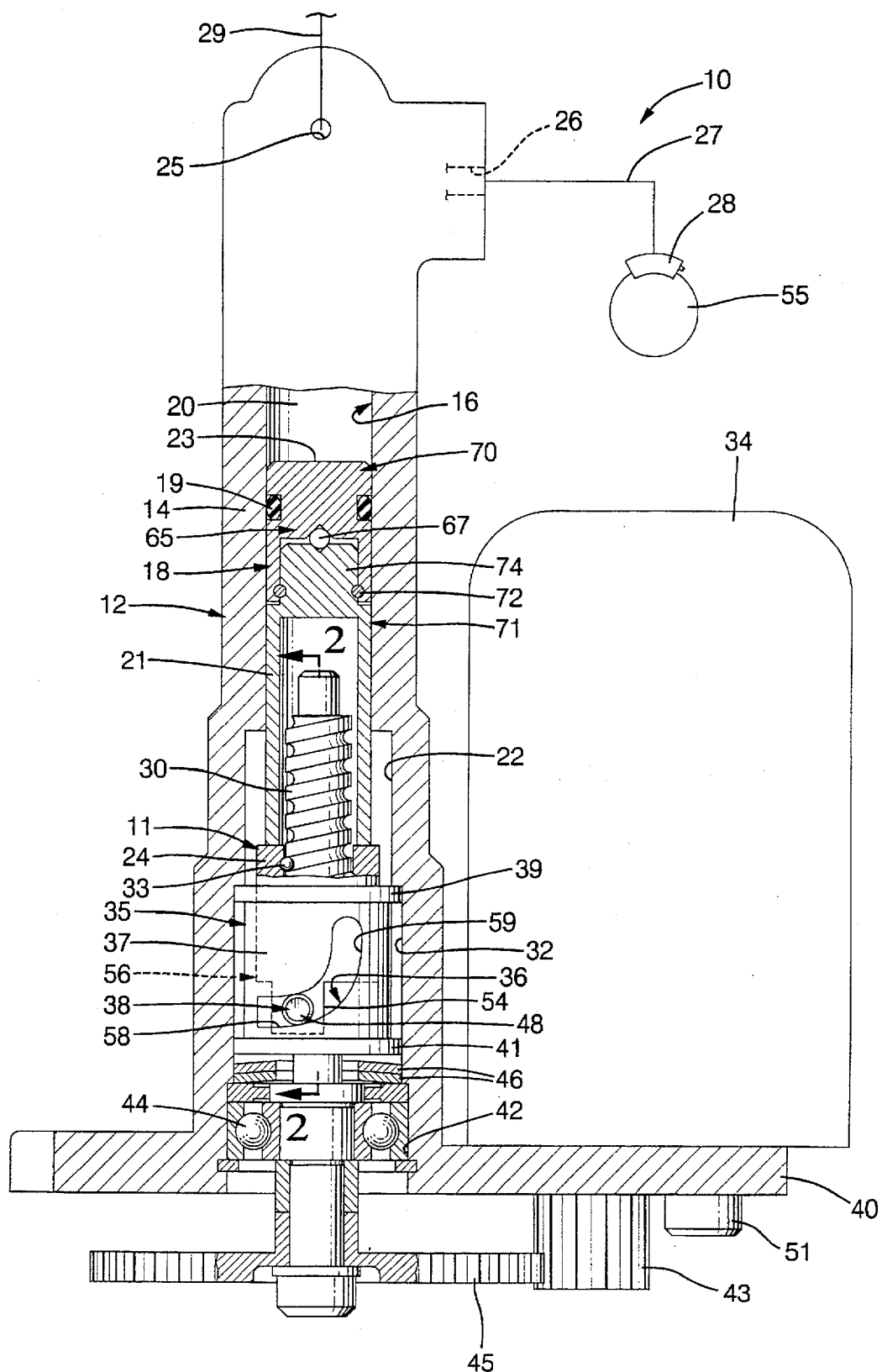
FIG. 1 is a fragmentary cross sectional illustration of a variable screw-driven system.

Referring to the drawings, illustrated in FIG. 1 is a variable screw-driven system embodied in a vehicle braking system designated in the aggregate as 10. Braking system 10 includes modulator 12 which is disposed between a wheel brake 28 and a master cylinder (not illustrated). The modulator 12 communicates with the wheel brake 28 through port 26 and brake line 27. The modulator 12 communicates with the master cylinder through port 25 and brake line 29. The master cylinder can be selectively isolated from the modulator 12 by means of a selectively closeable valve disposed in the brake line 29 or provided as part of the modulator 12 as is conventionally known in the art.

The modulator 12 includes a body 14 within which stepped longitudinal bore 16 is defined. A piston assembly 18 is slidably disposed in stepped longitudinal bore 16. The piston assists in defining a chamber 20 within the stepped longitudinal bore 16. The chamber 20 communicates through the brake line 27 with the wheel brake 28 and through the brake line 29 with the master cylinder. When the master cylinder is selectively isolated from the chamber 20 any volumetric changes of the chamber 20 effected by translation of the piston assembly 18 within the stepped longitudinal bore 16 result in a corresponding pressure increase or decrease which is communicated through the brake line 27 to the wheel brake 28. Therefore, the modulator 12, by means of linear translation of piston assembly 18, effects application action or release action of the wheel brake 28 by a selective pressure increase or decrease effected in the chamber 20.

Linear translation of the piston assembly 18 is provided through operation of variable screw-driven mechanism 11. Screw-driven mechanism 11 includes a threaded shaft designated as drive screw 30. Drive screw 30 extends into the body 14 of modulator 12 and is substantially axially centered in the stepped longitudinal bore 16. The drive-screw 30 is rotatably supported by bearing assembly 44 which is fixed in segment 42 of stepped longitudinal bore 16. Bi-directional rotation of drive screw 30 is effected by motor actuator 34 which engages drive screw 30 through gears 43 and 45. Motor actuator 34 is fixed on mounting base 40 of body 14 by means of a plurality of fasteners such as fastener 51.

Piston assembly 18 carries a seal 19 to maintain fluid separation between chamber 20 and the remainder of stepped longitudinal bore 16. Piston assembly 18 also includes a piston sleeve 21 which extends over the drive screw 30 and fixedly engages nut 24. Accordingly, linear translation of the nut 24 effects a corresponding linear translation of the piston assembly 18 within stepped longitudinal bore 16. A plurality of spring washers 46 are positioned between bearing assembly 44 and cam assembly 35 to cushion the travel of nut 24 at the end of its travel during a pressure reduction mode of the system 10.

Nut 24 is carried on drive screw 30 and is movable through segment 22 and segment 32 of stepped longitudinal bore 16. A plurality of ball bearings 33 are engageably carried between the drive screw 30 and the nut 24. A cam follower 38 is fixed in the cam assembly 35 to move in concert with the nut 24 and is disposed in-part within cam track 36. The cam track 36 is formed in cam sleeve 37 which is fixed in position within segment 32 of stepped longitudinal bore 16. The cam assembly 35 effects selected rotation of nut 24 during linear translation thereof as effected by rotation of drive screw 30.

To effect rotation of the nut 24 by means of following the cam follower 38 through the path dictated by the cam track, a radial force is generated. This occurs during the application of large forces to the top 23 of piston assembly 18 resulting from high fluid pressures in chamber 20. It has been found that friction between the piston assembly 18 and nut 24 must be reduced to facilitate rotation of nut 24 and to maintain proper contact between the cam follower 38 and the cam track 36. Accordingly, the present embodiment includes a thrust bearing assembly 65 that is incorporated to permit relative rotation between the top 23 of the piston assembly 18 and the nut 24 and resulting in reduced friction therebetween.

The thrust bearing assembly 65 includes a single ball bearing 67 that is carried between two component parts of the piston 18 which are designated as piston body 70 and piston extension 71. The piston extension 71 is the part of piston assembly 18 that is fixedly secured to the nut 24. The piston extension 71 terminates at a turned-down post 74 which supports the ball bearing 67 in a seat. The post 74 is received within the piston body 70. The piston body 70 includes a corresponding seat for containing ball bearing 67. A retaining clip 72 is carried between an external groove on the piston extension 71 and an internal groove on the piston body 70 to maintain contact between the two during longitudinal movement of the piston 18 within the stepped longitudinal bore 16. This prevents dislodgment of the ball bearing 67.

The cam track 36 is designed such that in the present embodiment during initial translation of the piston assembly 18 in a direction which effects reduction of the volume of chamber 20 and a corresponding brake application action, the incremental rotation of nut 24 advances at a relatively high rate due to the substantial horizontal orientation of the cam track 36. This part of cam track 36 is designated as substantially horizontal section 58.

As linear translation of the piston assembly 18 approaches its uppermost limit effective rotational translation of the nut 24 substantially ceases due to the substantially vertical orientation of the cam track 36. This part of cam track 36 is designated as substantially vertical section 59.

The transition from substantially horizontal section 58 to substantially vertical section 59 results in increasingly slower linear translation of the piston assembly 18 for constant revolutions per minute operation of the motor actuator 34 and the drive screw 30 as opposed to when the cam follower 38 is disposed in the substantially horizontal section 58 of cam track 36. Relative linear translation of the piston assembly 18 slows and is substantially determined solely by the pitch of the screw 30 when the cam follower 38 is operating in the substantially vertical section 59 of the cam track 36.

The effective screw pitch that results is designed to correspond with the fact that the modulator 12 is actuating wheel brake 28 through the brake line 27. During initial pressurization of the system 10, with the associating master cylinder isolated through braking line 29 from the modulator 12, the wheel brake 28 operates wherein brake pads (not illustrated) begin to contact the rotor 55. With relatively low pressure existing at this point in the brake line 27 and in chamber 20, relatively rapid linear translation of the piston assembly 18 is preferable. Therefore, rotation of the nut 24 by means of the cam follower 38, in addition to rotation of the drive screw 30 by means of the motor actuator 34, acts to effect a relatively rapid linear translation of the piston assembly 18.

Subsequently, during further pressurization of the system 10, as the brake pads come fully into contact with the rotor 55 and pressure begins to build in the braking line 27 and the chamber 20, flow rate is reduced as the cam follower 38 approaches the substantially vertical section 59 of cam track 36. As the cam follower fully enters substantially vertical section 59 linear translation of the piston assembly 18 is substantially effected solely by rotation of the drive screw 30 by means of motor actuator 34.

Figure 3:
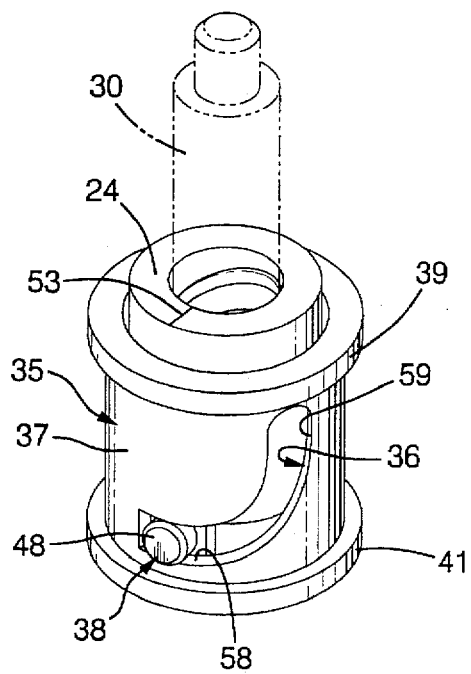
FIG. 3 is a schematic perspective illustration of the cam area of FIG. 1.
Figure 4:
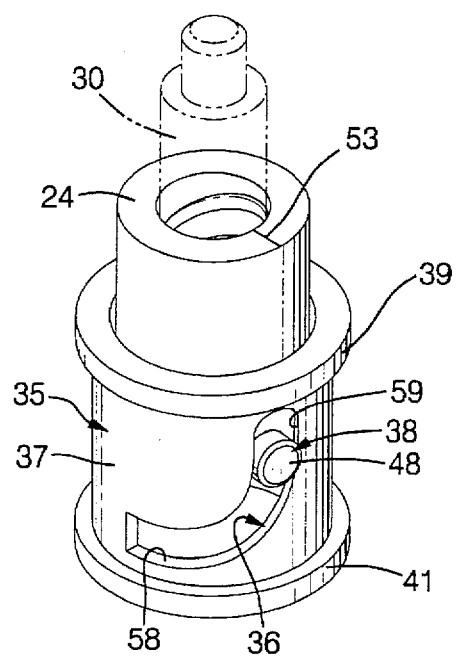
FIG. 4 is a schematic perspective illustration of the cam area of FIG. 1.

Operation of the cam assembly 35 is more fully demonstrated by the schematic representations illustrated in FIGS. 3 and 4 and therefore, reference is directed thereto. As shown in FIG. 3, the cam follower 38 is in the substantially horizontal section 58 of the cam track 36. The cam sleeve 37 is fixed against rotation in the bore segment 32. When the drive screw 30 is rotated clockwise as viewed from above, the nut 24 will translate upwardly, (as viewed in FIG. 3), in response. As the nut 24 translates in an upward direction, the cam follower 38 tracks in cam track 36 causing the nut 24 to rotate in a counterclockwise direction as it translates upwardly.

As viewed in comparison to FIG. 4 which shows the displacement of reference line 53 on nut 24 by means of the cam assembly 35, translation of the nut 24 in the upward direction is effected by cumulative rotation of both the drive screw 30 and the nut 24. As the cam follower 38 enters the substantially vertical section 59 of cam track 36 as shown in FIG. 4, rotational translation of nut 24 substantially ceases and therefore, vertical translation of the nut 24 is substantially effected solely by rotation of the drive screw 30.

The specific profile of the cam track 36 can be modified to effect the desired response in linear translation of the nut 24 which results in a corresponding linear translation of the piston assembly 18 as shown in FIG. 1. It can be seen that during rotation of the drive screw 30 in a first direction, as the cam follower 38 moves from the substantially horizontal section 58 to the substantially vertical section 59, linear translation speed of the nut 24 is slowed. Similarly, when the drive screw 30 is rotated in a second direction, opposite to the first direction, as the cam follower 38 moves from the substantially vertical section 59 to the substantially horizontal section 58, linear translation speed of the nut 24 is increased.

Figure 2:
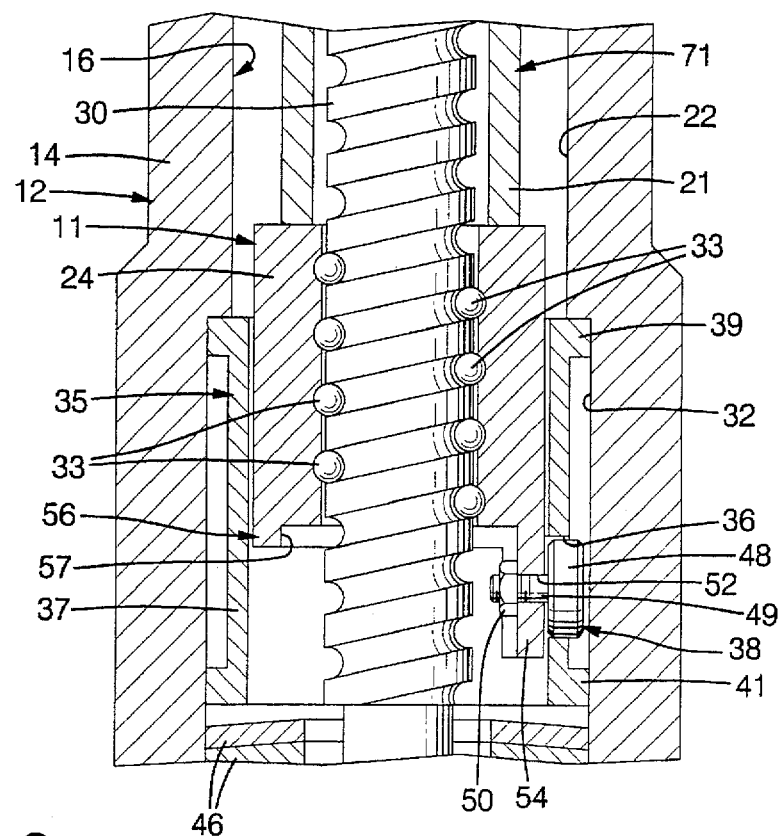
FIG. 2 is a detailed illustration of the cam area of FIG. 1.

Referring to FIG. 2, the cam assembly 35 is illustrated in greater detail. The drive screw 30 is embodied with right-handed threads however, the present invention would be fully operational in a left-handed thread embodiment with coordinated operation through motor actuator 34 and a matching cam profile. The nut 24 and the piston sleeve 21 are linearly translatable relative to the drive screw 30 by means of rotation of the drive screw 30 with the plurality of ball bearings 33 effecting movement of the nut 24.

A cylindrical nut extension is effectively provided as part of the nut 24 and is either fixed thereto or formed integrally therewith. The inner wall 57 of cylindrical nut extension 56 is spaced away from the drive screw 30 so that shaft 49 of cam follower 38 may be received within opening 52 fixing cam follower 38 on leg 54 of cylindrical nut extension 56 by means of nut 50. The cam follower 38 includes a roller 48 which is disposed within cam track 36 of cam sleeve 37. Cam sleeve 37 includes annual legs 39 and 41 for fixing cam sleeve 37 in a nonrotatable fashion within the stepped longitudinal bore 16 of modulator 12.

Figure 5:
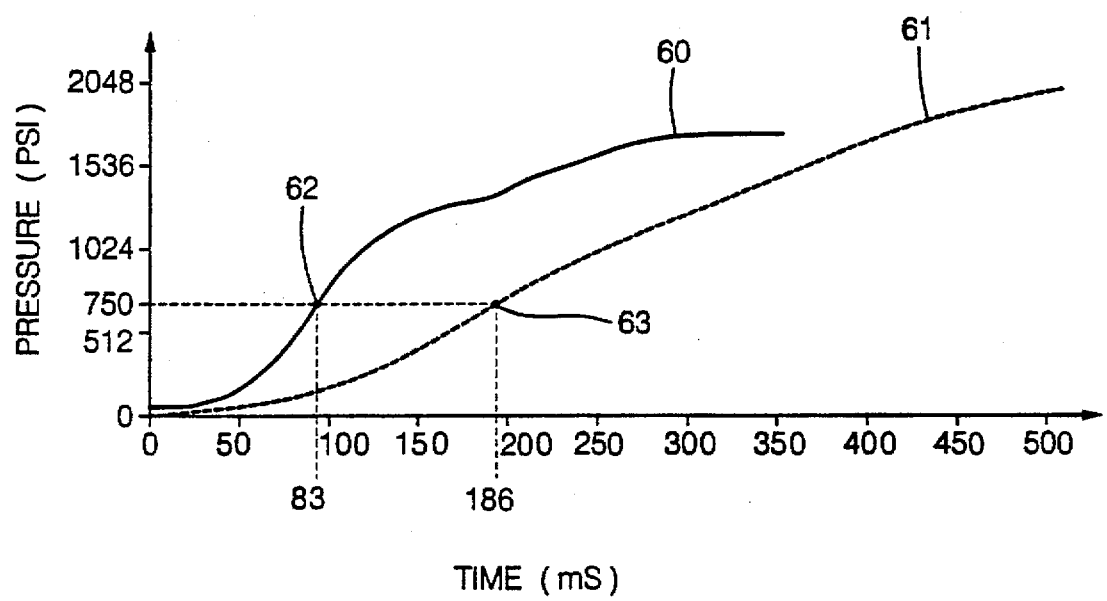
FIG. 5 is a graph of pressure versus time for a fixed pitch screw-driven system and a variable effective pitch screw-driven system.

Referring to FIG. 5, the fluid pressure response at wheel brake 28 is graphically illustrated. The graph charts piston generated pressure on the abscissa and time on the ordinate. FIG. 5 demonstrates the performance of an effective variable pitch screw-driven system according to the present invention at curve 60 with a 0.5 inch pitch drive screw. Additionally, the response of a conventional fixed pitch screw-driven system with a 0.125 inch pitch drive screw at curve 61 is shown for a comparison. The initial pressure response of the system illustrated by performance curve 60 shows that a marked increase in pressure build rate is effected as compared to that of curve 61. Point 62 on performance curve 60 shows that a pressure of 750 psi is achieved at 83 milliseconds whereas point 63 on curve 61 shows that 750 psi is not achieved until 186 milliseconds has elapsed. Curves 60 and 61 demonstrate the performance difference between variable and fixed-pitch screw driven systems using a common motor, voltage and current limit.

The marked increase in pressure build rate of curve 60 is effected while system energy usage is optimized. The relatively rapid pressure build rate illustrated by the performance curve 60 results from the enhanced linear translation of piston assembly 18 resulting from simultaneous rotation of drive screw 30 effected by motor actuator 34 and rotation of nut 24 effected by cam assembly 35. By way of example, the cam assembly 35 and the variable screw driven system when used with a 0.5 inch screw pitch on the drive screw 30 results in a fast response and relatively rapid linear translation of the nut 24 and piston assembly 18 when preferable and with assistance from the cam assembly 35, generates high pressures in the chamber 20 when required. If a 0.5 inch pitch drive screw is used in a fixed-pitch screw driven system to increase translational speed, approximately four times as much current would be required to generate the same pressure levels of the variable screw driven system according to the present invention.

By means of the modulator 12, a variable screw driven system is provided that has particularly useful application in the brake system 10. In the present embodiment, the cam assembly 35 is tailored to such use. The present invention is not intended to be limited to such application however, and it can be seen that the foregoing description provides details of a system that is capable of a variety of uses.

What is claimed is:

1. A variable screw-driven system comprising:
   a rotatable drive screw;
   a nut disposed about the rotatable drive screw, interacting with the rotatable drive screw and linearly translatable in response to rotation of the drive screw;
   a cam assembly including a cam follower carried to travel in concert with the nut, the cam assembly forming a cam track having a selected profile and within which the cam follower is disposed, wherein during rotation of the drive screw, linear translation of the nut effects tracking of the cam follower within the cam track such that rotation of the nut is effected simultaneously with rotation of the drive screw resulting in an effective variable pitch of the variable screw-driven system wherein linear translation of the nut is effected by both rotation of the drive screw and rotation of the nut caused by the cam assembly.

2. A variable screw driven system according to claim 1 further comprising a piston assembly that is linearly translatable in concert with the nut, the piston assembly including a piston extension fixedly engaging the nut and a piston body retained in engagement with the piston extension by a retainer and rotatably supported on the piston extension by a ball bearing.

3. A variable screw driven system according to claim 2 further comprising a modulator having a bore with a chamber defined in the bore with assistance from the piston assembly wherein the nut and the piston assembly are linearly translatable in the bore to effect a fluid pressure change in the chamber.

4. A variable screw driven system according to claim 3 wherein the fluid pressure change is characterized by having a variable rate, the variable rate being dependent upon the selected profile of the cam track.

5. A variable screw-drive system comprising:
   a rotatable drive screw;
   a nut, linearly translatable in response to rotation of the drive screw and disposed about the drive screw, the nut including a cylindrical extension;
   a cam follower fixed to the cylindrical extension of the nut;
   a cam sleeve disposed about the drive screw and including a cam track having a selected profile and within which the cam follower is disposed wherein during rotation of the drive screw linear translation of the nut effects tracking of the cam follower within the cam track such that rotation of the nut is effected simultaneously with rotation of the drive screw resulting in an effective variable pitch of the variable screw-driven system wherein linear translation of the nut is effected by both rotation of the drive screw and rotation of the nut.

6. A variable screw driven system according to claim 5 further comprising a piston assembly that is linearly translatable in concert with the nut, the piston assembly including a piston extension fixedly engaging the nut and a piston body retained in engagement with the piston extension by a retainer and rotatably supported on the piston extension by a ball bearing.

7. A variable screw driven system according to claim 6 further comprising a modulator having a bore with a chamber defined in the bore with assistance from the piston assembly wherein the nut and the piston assembly are linearly translatable in the bore to effect a fluid pressure change in the chamber.

8. A variable screw driven system according to claim 7 wherein the fluid pressure change is characterized by having a variable rate, the variable rate being dependent upon the selected profile of the cam track.

9. A variable screw-drive system comprising:
   a modulator forming a longitudinal bore and a port opening to the longitudinal bore;
   a wheel brake;
   a brake line extending between the port and the wheel brake;
   a piston assembly translatably carried within the bore and assisting in defining a chamber within the bore, the chamber open to the port;
   a rotatable drive screw extending into the bore;
   a nut fixedly engaging the piston assembly and linearly translatable within the bore in response to rotation of the drive screw and disposed about the drive screw, the nut including a cylindrical extension;
   a cam follower fixed to the cylindrical extension of the nut;
   a cam sleeve disposed in the bore and about the drive screw and including a cam track having a selected profile and within which the cam follower is disposed wherein during rotation of the drive screw a first linear translation of the nut effects tracking of the cam follower within the cam track such that rotation of the nut is effected simultaneously with rotation of the drive screw resulting in an effective variable pitch of the variable screw-driven system wherein a second linear translation of the nut is effected by both rotation of the drive screw and rotation of the nut so that translation of the piston in the bore is coordinated with the second linear translation of the nut to effect expansion and contraction of the chamber.

10. A variable screw driven system according to claim 9 wherein the piston assembly includes a piston extension fixedly engaging the nut and a piston body retained in engagement with the piston extension by a retainer and rotatably supported on the piston extension by a ball bearing.

11. A variable screw driven system according to claim 10 wherein a chamber is defined in the longitudinal bore with assistance from the piston assembly and wherein the nut and the piston assembly are linearly translatable in the longitudinal bore effecting a fluid pressure change in the chamber.

12. A variable screw driven system according to claim 11 wherein the fluid pressure change is characterized by having a variable rate, the variable rate being dependent upon the selected profile of the cam track.

* * * * *